United States Patent Office 2,951,030
Patented Aug. 30, 1960

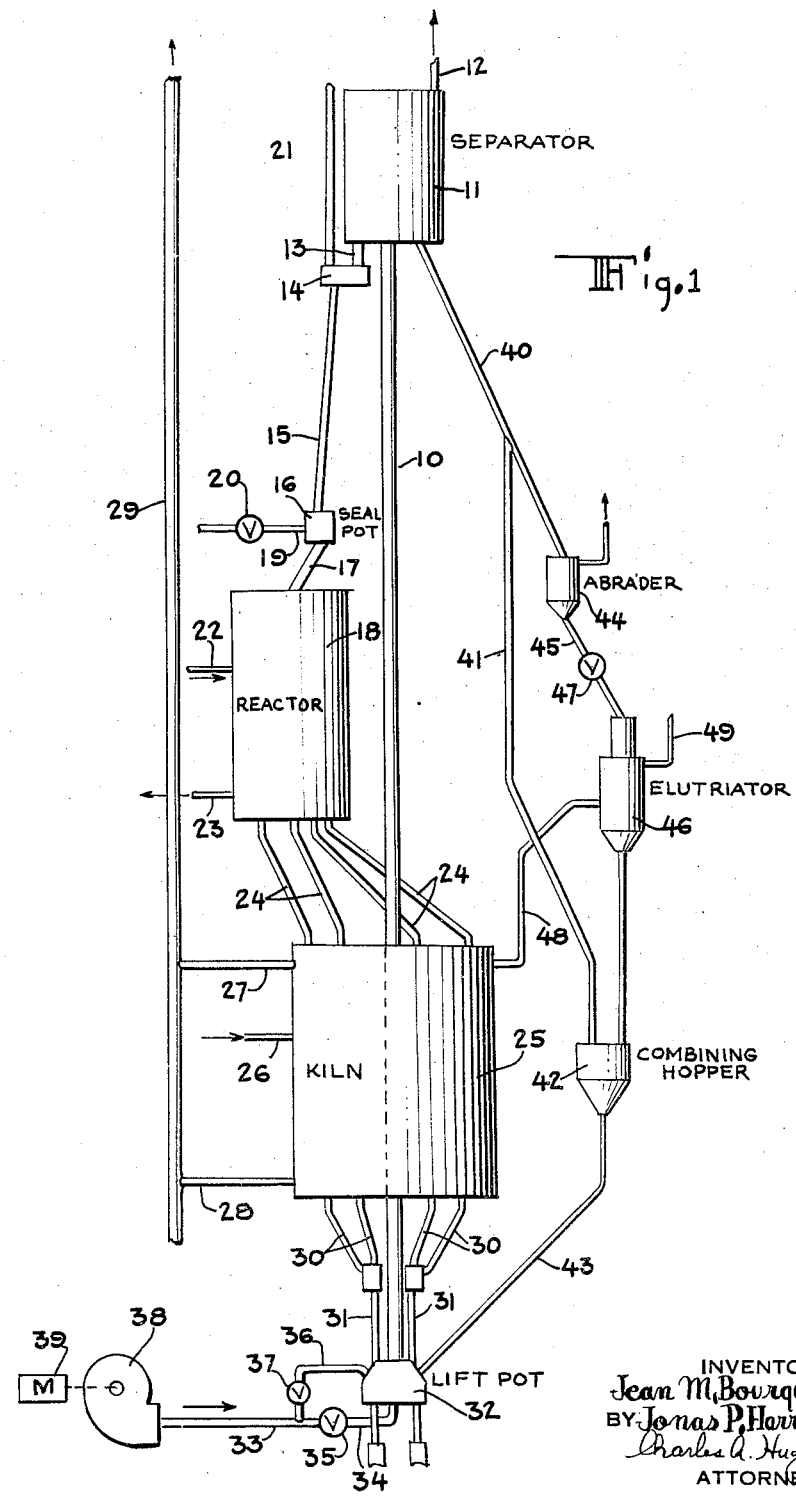

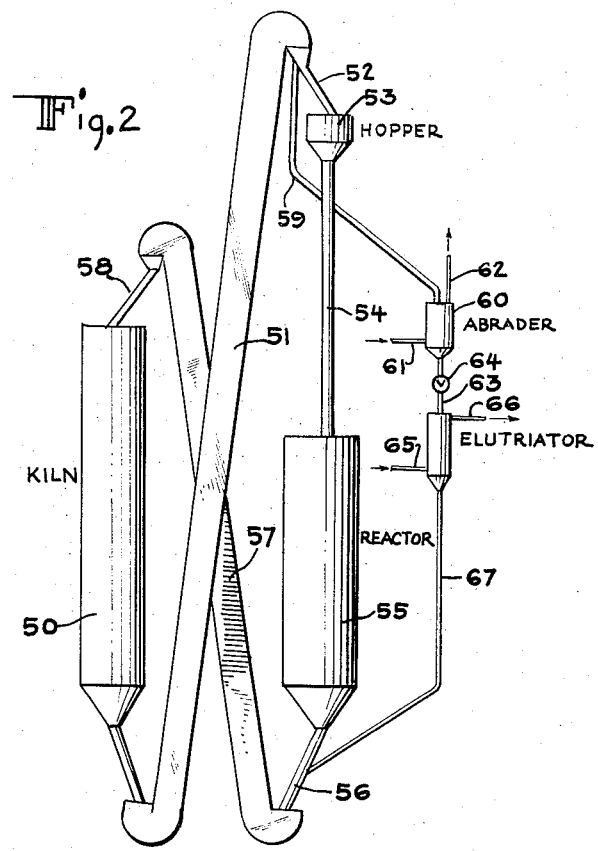
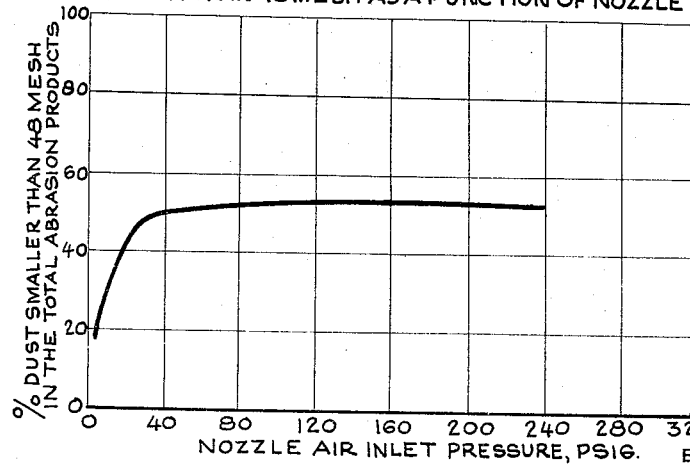

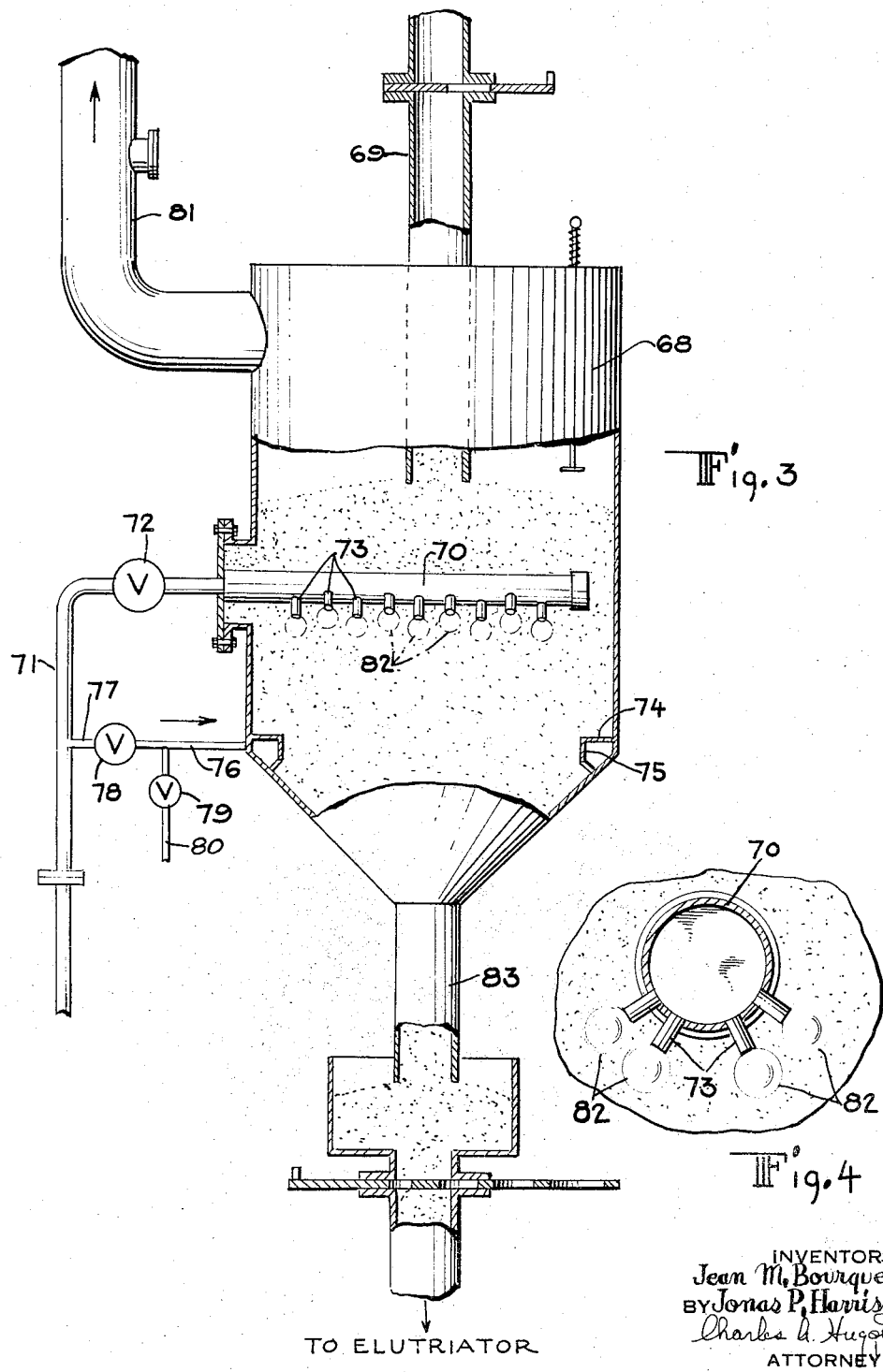

2,951,030

METHOD AND APPARATUS FOR MAINTAINING CATALYTIC MATERIAL IN HIGH ACTIVITY

Jean M. Bourguet and Jonas P. Harrison, both of Woodbury, N.J. (Both % Socony Mobil Oil Company, Inc., Paulsboro, N.J.)

Filed Dec. 11, 1957, Ser. No. 702,145

3 Claims. (Cl. 208—165)

This invention relates to the continuous contacting of hydrocarbons with a solid granular catalyst to effect conversion of the hydrocarbons and is particularly concerned with an improved method for maintaining the catalyst in an active condition in a moving bed hydrocarbon conversion process such as the TCC process.

A variety of moving bed hydrocarbon conversion processes are now well known such as, for example, cracking, reforming, treating, desulfurization and others. In these processes the catalyst is passed as a gravitating bed through a reaction zone maintained at appropriate temperature and pressure and the heated hydrocarbons or petroleum fractions are passed continuously through the bed whereby the conversion of the hydrocarbons occurs. As the granular catalyst gravitates downwardly through the reaction zone, it becomes contaminated by the deposition on the catalyst and within the pores of the catalyst of a coke deposit and is normally transferred to a regeneration zone for revivification. The spent catalyst is passed to a regenerator and gravitated as a compact mass through the regenerator. Air is passed through the catalyst bed in the regenerator to burn the coke deposits from the catalyst and reactivate the catalyst for reuse in the process. The presence of the coke on the catalyst causes the catalyst to have a decreased catalytic activity for the conversion of the hydrocarbons to the desired product. However, if the coke is removed under carefully controlled conditions, the catalyst regains substantially its former activity for catalytic conversion. The freshly regenerated catalyst is therefore transferred from the bottom of the regenerator directly to the top of the gravitating bed of catalyst in the reaction zone for reuse in the process.

The TCC process for cracking petroleum oils to upgrade the oils and provide increased amounts of motor fuel has been used commercially throughout the world. In this process the reaction zone is generally maintained at about 800-1000° F. and the regeneration zone at about 1000-1400° F. The pressure in the reaction zone is usually about 10 to 15 pounds per square inch gauge and about atmospheric in the regeneration zone. Continuous bucket elevators and gas lifts have been used commercially for transporting the catalyst between the contacting zones. The catalyst is a granular clay or clay-like material, natural or treated, or is alternatively a synthetic silica-alumina, chromia or similar particulate material usually in the form of granular particles, pellets, pills or spherical beads. These catalyst particles are formed by a variety of processes well known in this art and are usually about 4 to 12 mesh Tyler in size, although larger or smaller particles have at times been used.

It has been known for some time that various metals found in certain of the hydrocarbon feed stocks charged to the reactor for cracking purposes have a deleterious effect upon the catalyst. These metals such as, for instance, vanadium, sodium, nickel, iron and copper, appear to combine in some way with the catalyst and cause the catalyst to change its characteristics so that less of the charge material is converted to usable motor fuel. The activity and selectivity of cracking catalysts are generally evaluated in a standard laboratory test apparatus and are given a number which indicates the ability of the catalyst to convert the charge to motor fuel. The catalyst activity test generally used involves the passage of a standard charge such as a light East Texas gas oil over a 200 ml. fixed bed of catalyst at 800° F. for a ten-minute period at 1.5 liquid hourly space velocity. The products formed as a result thereof—gas, gasoline, gas oil and coke—are measured under stated conditions. The percentage of gasoline produced by this test is used as the indicator of activity of the catalyst. Fresh catalyst charged to a TCC unit may have a catalyst activity of 30 to 45. As the catalyst is used, the activity will decrease for various reasons and hence the activity may fall to a level of about 28 to 35 in a continuously operating unit. As long as the activity can be maintained within the neighborhood of 28 to 35, the operation is satisfactory and commercially acceptable.

As the catalyst is circulated through these systems, the particles are broken or worn away as a result of the attrition of the particles moving against particles or against the metal walls of the system. Furthermore, a certain amount of attrition occurs as a result of the transfer of the catalyst through the elevators or lifts. It is undesirable to have small fine particles build up to any extent in these systems since they tend to plug the void spaces in the catalyst bed through which the gases are transferred. This tends to cause an uneven distribution of the gas in the bed, which is exceedingly undesirable since it tends to cause an uneven distribution of coke on the catalyst particles and, furthermore, tends to cause uneven burning in the regeneration zone which may cause the development of temperatures in localized regions which are sufficiently high to damage the catalyst and render it unfit for further use in the process. When the temperature in the regeneration bed exceeds certain well defined upper limits, the catalyst activity is rapidly decreased and cannot be restored to a high level by any treatment. For this reason, fines are continuously removed from the system so as to keep the fines content down to a workable level. This, of course, results in a reduction of the catalyst inventory and hence fresh catalyst must be continuously added to replace the lost catalyst. Since this fresh catalyst has a catalyst activity number higher than the average of the catalyst in service, the replacement made necessary by the attrition tends to maintain the average catalyst activity number up and as long as attrition is high enough, the average catalyst activity number is maintained high enough to make a sufficient amount of gasoline. However, ways and means have been studied to reduce the attrition of the catalyst since the catalyst is expensive and the addition of fresh catalyst to the system is a factor tending to decrease the economy of operation. Improvements in the transfer system have been effected so that very little catalyst need be added to the system to maintain proper inventory at the present time. In some commercially operating systems this has caused the effect of metal poisoning to be more pronounced since the catalyst remains in the system for a longer period of time and the poisonous metals seem to build up to a higher level in the catalyst. As a result, the catalyst activity in these systems has dropped to such a low level that the efficiency of the system has been undesirably reduced even though less expensive catalyst has to be added to the system.

The inventors have discovered that the poisonous metals tend to locate near the outer surface of the catalyst and that, if this surface could be removed without damage to the remainder of the catalyst, the activity of the catalyst could be restored. With this in mind, the inventors have developed a method and apparatus for abrading the surface of this catalyst under carefully controlled conditions so that the size of the particles is not substantially reduced and yet a sufficient amount of the surface of the catalyst is removed to cause a substantial elevation of the catalyst activity. The invention involves the continuous passage of a compact stream of catalyst downwardly from an elevation in the system to a confined abrading zone where the compact stream of catalyst is released within the abrading zone at a level substantially below the top thereof to travel laterally and completely fill the cross-section of the abrading zone and form a gravitating mass within the zone. At one or more locations within this gravitating mass, a stream of gas is released at a sufficient pressure and flow rate so as to form a bubble of gas completely enclosed by a compact mass of gravitating catalyst. Within the bubble the catalyst particles tend to whirl in a circuitous path around the envelope of the bubble whereby the surface of the particles is abraded without causing substantial breakage of the beads. The removed surface is reduced to fine particles which travel upwardly through the void spaces in the bed with the abrading gas. The gas and fines are removed from the top of the bed and are discharged from the top of the abrading zone. The reactivated catalyst particles gravitate as a compact stream from the bottom of the abrading zone and are introduced back into the cyclic system at a lower level in the system. By circulating a sufficient amount of catalyst through this side stream, the catalyst activity can be maintained at the desired operating activity level without requiring the addition of substantial amounts of fresh catalyst.

The object of this invention is to provide an improved method for removing impurities from the surface of a granular catalyst.

Another object of this invention is to provide an improved method for removing surface impurities from a catalyst in a moving bed cracking system to maintain the catalyst at high operating activity.

A further object of the invention is to provide an improved method for abrading catalyst in a TCC system subject to metal poisoning from impurities in the charge to prevent the catalyst from becoming deactivated by metal contamination.

These and other objects will be made more apparent in the following detailed discussion of the invention.

Figure 1 is an elevational view of a complete hydrocarbon conversion system incorporating the invention using a pneumatic lift as catalyst elevating means.

Figure 2 is a diagrammatic showing of a moving bed conversion system in which the invention has been incorporated which utilizes continuous bucket elevators as the means of elevating the catalyst.

Figure 3 is a vertical elevation in cross-section of the abrading apparatus.

Figure 4 is a cross-sectional view of the manifold 70 of Figure 39 seen on plane 4—4 of Figure 3.

Figure 5 is a graph showing the relationship of dust produced in the abrading apparatus against the pressure in the nozzle of the apparatus.

Figure 6:
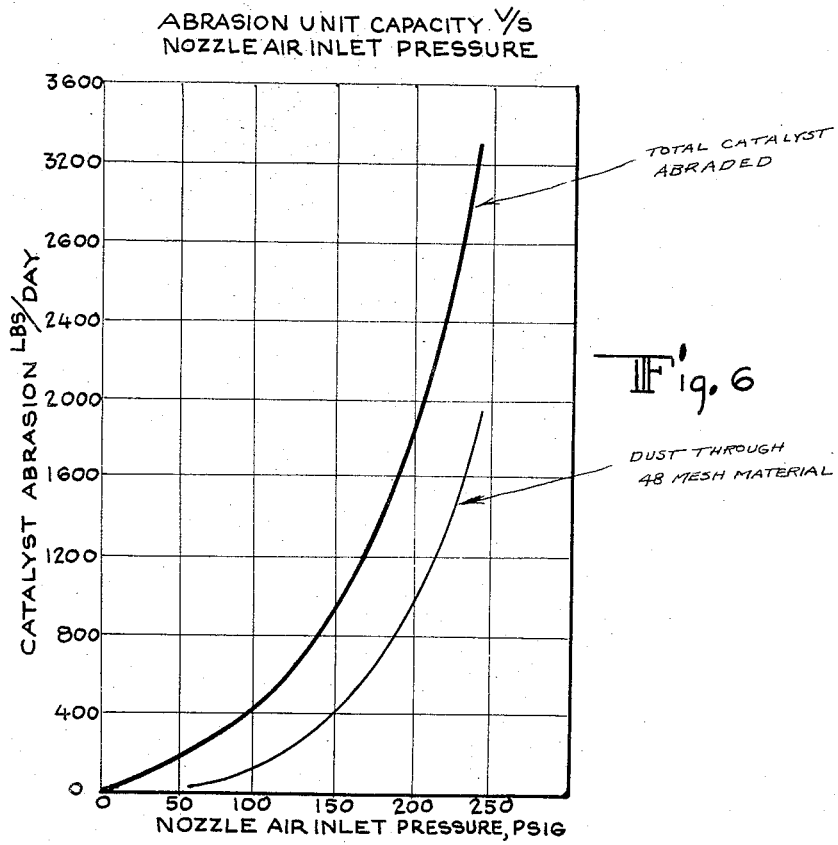
Figure 6 is a graph showing the abrasion capacity of the abrading apparatus as a function of the inlet gas pressure.

Referring now to Figure 1, a superimposed TCC system using a pneumatic elevator or lift is illustrated. The catalyst is charged from the top of the lift pipe 10 into the separator 11 and settles to the bottom of the vessel. Gas used to elevate the catalyst is discharged from the top of the separator through the vent 12. Collected catalyst is gravitated as a compact bed from the bottom of the separator through conduit 13, gas disengaging chamber 14, feed leg 15, seal pot 16 and connecting conduit 17 into the reactor 18. This connecting system between the reactor and separator is made long enough to insure that the catalyst will feed smoothly and continuously into the reactor against the advanced pressure existing therein. A suitable inert gas such as steam or flue gas is introduced into the seal pot 16 through the conduit 19 at a rate controlled by the valve 20. Some of this gas travels upwardly through the feed leg and a small amount of the gas travels downwardly into the reactor. This seal gas serves to prevent reactants from escaping from the reaction vessel. The gas passing upwardly through the feed leg disengages from the catalyst in the chamber 14 and passes to the atmosphere through the gas vent pipe 21. Hydrocarbons suitably prepared for treatment are introduced into the reactor through the conduit 22 and travel through the voids in the gravitating catalyst bed, the conditions in the bed being adjudsted to provide the desired rearrangement of the hydrocarbon molecules. The products formed by the cracking reaction are removed from the lower portion of the reactor through the conduit 23 and pass to further processing apparatus not shown. During this cracking reaction a deposit of cokey material is located on the catalyst and serves to reduce the cracking activity of the catalyst. In addition, metals found in the hydrocarbons charged to the reactor are deposited on the catalyst. The most important of these metals are nickel and vanadium. The spent catalyst is removed from the bottom of the reactor through the conduits 24 and is passed as a compact mass through the kiln 25. The kiln 25 is of annular cross-section and is located about the lift pipe. Air is introduced into the kiln through the conduit 26 at an intermediate level. The air is split into two streams within the kiln, one portion traveling upwardly through the bed to burn a portion of the contaminant and the second portion traveling downwardly through the bed to complete the combustion of the contaminant. Flue gas is removed from the top of the bed through the conduit 27 and the bottom of the bed through the conduit 28. This flue gas passes through the exhaust stack 29 and is eventually released to the atmosphere. This combustion removes the cokey deposits but does not remove the metals accumulated on the surface of the catalyst. If the metals content is not high, the activity of the catalyst is restored to substantially its original activity. However, since the metals such as nickel or vanadium deposited on the catalyst are not removed by combustion, the amount of such metals increases with each cycle of catalyst contact with the reactants in the reactor and hence eventually builds up to a level which is harmful. It has been the practice in the past to withdraw a substantial amount of this catalyst at a time when the metals content is dangerously high such as over 100 parts per million of nickel content. This catalyst is then replaced with fresh catalyst so as to provide a catalyst inventory of satisfactory average activity. This procedure is objectionable because it requires the use of a substantial amount of fresh, expensive catalyst and, furthermore, provides only an average activity improvement. Individual particles in the system show wide differences in activity and metals content.

The regenerated catalyst is removed from the bottom of the kiln through the conduits 30 and 31 and introduced into the lift pot 32. A gas such as air is passed through the conduit 33 and is split into a primary and secondary stream. The primary stream is introduced into the bottom of the lift pot through the conduit 34 at a rate controlled by the valve 35. The secondary lift gas is introduced into the lift pot through the conduit 36 at a rate controlled by the valve 37. The primary stream of gas is passed directly into the lower end of the lift pipe whereas the secondary stream of gas is first passed through the catalyst bed in the lift pot so that this stream acts as a means of adjusting the flow rate of catalyst through the lift pipe. A blower 38 powered by a motor 39 is used to provide the air for the operation of the system. A small amount of the circulating catalyst is withdrawn from the bottom of the separator 11 through a conduit 40 as a compact gravitating stream. A portion of this catalyst travels downwardly through the conduit 41 to a combining hopper 42 and then through the conduit 43 to the lift pot 32. A second portion of this catalyst is passed through the abrader 44 and the conduit 45 to the elutriator 46. The valve 47 in the conduit 45 is used to convert the flow of catalyst from compact to freely falling so that as the catalyst passes through the elutriator, it is falling through a stream of rising gas. This gas is generally flue gas obtained from the top of the regenerator 25 and passed through the conduit 48 to the lower portion of the elutriator 46. The upward velocity of this gas in the elutriator is adjusted so that it will carry fine particles with it without interfering with the fall of the granular particles reusable in the TCC process. The fines and flue gas are removed from the upper portion of the elutriator through the conduit 49.

While the TCC system shown on Figure 1 has found wide commercial acceptance, there is shown on Figure 2 an alternate type of TCC system used commercially in many locations. In this adaptation of the TCC process the kiln and reactor are located in side by side relationship. For instance, the catalyst is passed downwardly through the kiln 50 as a compact gravitating bed. This kiln may be of the multi-stage type in which catalyst is passed through a series of burning and cooling zones. The multistage kiln is well known in the art and will not be described in further detail. The regenerated catalyst is elevated through a continuous bucket elevator 51 and discharged through a downwardly sloping chute 52 into the hopper 53. The particles gravitate through the gravity feed leg 54 into and through the reactor 55 where the catalyst is contacted with petroleum hydrocarbons suitably prepared for treatment. Here, contaminating metals in the charge are deposited on the catalyst. The spent catalyst is discharged through the conduit 56 and elevated by a continuous bucket elevator 57 to a location above the kiln 50. The spent catalyst is passed through the connecting conduit 58 to the top of the kiln 50. As the catalyst slides along the floor of sloping chute 52 before entering the hopper 53, the fines in the catalyst stream tend to percolate to the bottom of the stream. A small portion of the catalyst is withdrawn from the bottom of the chute 52 through the conduit 59 whereby a stream of catalyst is obtained rich in fine particles. This stream is passed through the abrader 60, gas is introduced into the abrader through the conduit 61 and discharged from the abrader through the conduit 62. The abraded catalyst, along with a substantial portion of the fine particles, is passed downwardly from the abrader through the conduit 63. The valve 64 is used to convert the flow of catalyst from compact flowing to freely falling. Gas is introduced into the elutriator through the conduit 65 to pass upwardly through the falling catalyst at a flow rate sufficient to remove substantially all the fine particles from the upper portion of the elutriator through the conduit 66. The abraded and elutriated catalyst particles are withdrawn from the bottom of the elutriator through the conduit 67 which connects into the conduit 56 below the reactor so as to return the catalyst to the cyclic system.

Referring now to Figures 3 and 4, the inner details of the abrading apparatus will be disclosed. The vessel 68 may be of circular, square or rectangular cross-section. The catalyst feed pipe 69 projects downwardly into the vessel and discharges at a substantial distance below the top of the vessel. The catalyst is passed downwardly through the conduit 69 as a compact flowing stream and this catalyst, when released from the bottom of the conduit 69, spreads laterally to cover the entire cross-section of the vessel 68. The catalyst surface within the vessel 68 will assume a sloping surface at a rather small angle with the horizontal. Substantially below the bed surface is located one or more horizontal pipe manifolds and these manifolds are connected to an external pipe 71. The flow of gas to the manifolds is adjusted by means of valve 72. Attached to the manifold 70 is a series of nozzles 73 uniformly distributed along the length of the manifold so that the nozzles are substantially uniformly distributed throughout the cross-section of the catalyst bed in the vessel 68. At the lower portion of the vessel 68 substantially below the manifold 70, horizontal and vertical baffles 74 and 75 are arranged continuously about the interior of the vessel to provide a gas engagement or disengagement space. The conduit 76 is connected to and communicates with the interior of the baffle arrangement provided by the baffles 74 and 75. The conduit 77 connects between conduit 76 and conduit 71 and valve 78 in conduit 77 may be used to control the flow of gas into the catalyst bed. If desired, valve 78 may be closed and valve 79 in conduit 80 opened to permit gas to be withdrawn from the lower portion of the gravitating catalyst bed. This permits a greater portion of gas to be discharged from the manifold 70 into the catalyst bed than can be disengaged from the surface of the catalyst bed. A sufficient amount of gas such as air or steam is introduced into the manifold 70 to provide at the outlets of the nozzles 73 a series of bubbles. It is important that the pressure of the gas in the manifold be high enough so that the gas discharge velocity at the nozzles is sufficiently high to cause catalyst particles to be projected at high speed about the interior of the bubbles, whereby the minute layer of the surface of the catalyst particles is removed without causing any substantial breakage of the catalyst particles. The total gas flow from the manifold may be adjusted over a wide range up to the maximum discharge capacity of the bed. Where all the gas is passed upwardly in the vessel 68, the discharge capacity is determined by the cross-section of the vessel as long as the vent pipe 81 does not substantially restrict the discharge of gas from the vessel. When a split flow arrangement is used, the amount of gas which can be passed through the bed can be increased up to the withdrawal capacity of both the surface of the bed and the baffle arrangement provided by the baffles 74—75. A portion of the fines produced by the catalyst abrasion is removed with the gas from the vessel 68. However, since the bubbles 82 are completely enclosed in a gravitating mass of catalyst, the compact gravitating stream of catalyst acts as a filter and tends to retain in the flowing stream a substantial portion of the fine particles. These fine particles then travel downwardly with the catalyst through the discharge pipe 83 and it is hence desirable to effect their removal by passing the stream of catalyst through an elutriator where more efficient fines removal can be obtained.

While several metallic elements are found in the heavier crudes now charged to TCC units, nickel is the most important element from the standpoint of loss of catalytic activity. Vanadium is a less important element since four times as much vanadium as nickel is needed to yield substantially the same effect in loss of catalytic activity. These elements, however, tend to behave the same way in effect upon catalytic activity. They cause the production of an increased amount of coke and light gases, especially hydrogen. This results in a reduction of the amount of heavy oil converted to usable motor fuel. While these elements have been referred to as catalyst poisons in the past, they are not in effect poisons but act to change the structure and catalytic activity of the catalyst. These elements have been used as hydrogenation-dehydrogenation catalysts in the past and show a dehydrogenation activity under cracking conditions particularly in the increased production of hydrogen. However, the type of reactions which the nickel and vanadium as catalysts produce is not desired in the cracking of heavy oils to produce increased quantities of motor fuel. Hence, when the nickel content of the catalyst exceeds about 60 parts per million as a tolerable upper limit, there is a loss of gasoline yield and increase in coke production. Below 60 parts per million, while the coke production may not be excessive, the gas production may be high, especially in hydrogen content, and this is generally disadvantageous where the gas plant is limited such as the capacity of compressors, absorbing towers and deethanizers, etc. The actual desirable limit of the nickel content of the catalyst depends upon many factors. However, about 30 parts per million is a reasonable upper limit in most instances. The abrader should be designed, therefore, to bring down and maintain the nickel content of the catalyst from whatever level it obtains without the abrader to below about 30 parts per million. In actual operating TCC units the nickel level may rise to high levels when the catalyst attrition is kept during operation at a very low value. When the nickel content in these units rises above 100 parts per million it causes a serious loss of efficiency in the unit which requires correction. Catalyst activity and nickel level have been maintained in these units by rejecting a substantial amount of the circulating catalyst and supplying new beads. This was neither selective nor efficient, since the catalyst left in the unit had a low activity while the new catalyst had a substantially higher activity. Only the average activity of the old and new catalyst was improved.

Example I

A catalyst abrader similar to the design shown on Figures 3 and 4 was constructed for use in a TCC unit having a catalyst circulation of 100 tons per hour and a total catalyst inventory of 308 tons of catalyst. The abrading vessel was a cylindrical member of 15½" inside diameter having a conical bottom section with sides sloping at 45° with the horizontal. The height of the cylindrical portion of the vessel was 36" and the feed conduit, being a 4" diameter pipe, was projected into the abrading vessel to a depth of 14" thereby providing a particle-free plenum space in the upper portion of the vessel. A suitable gas discharge pipe of adequate capacity was attached to the upper portion of the vessel communicating with the plenum space. In this vessel a single gas manifold of 2" diameter pipe was used and four rows of nozzles were attached to the manifold generally as indicated on Figures 3 and 4. The nozzles on the outer rows were 3" long and had 3/16" diameter apertures. The nozzles on the inner rows were 3" long and had 1/8" diameter apertures. A flow control slide valve having a graded series of apertures in the surface of the valve was provided below the abrading apparatus. The apertures were selected to permit the flow rate of catalyst through the vessel to be adjusted at 1.5, 3, 4.5, and 6 tons per hour. A small flow of air was introduced into the bottom of the vessel through the conduit 77 to aid in the removal of fines from the bed. The remainder of the air was introduced into the manifold 70 and discharged from the nozzles at a flow rate somewhat below the maximum disengaging capacity of the catalyst bed without causing the catalyst surface to rise into the plenum space in the upper portion of the vessel. The apparatus was operated over a wide range of pressures by changing the number of nozzles in operation, the nozzle arrangement being adjusted to provide substantially uniform distribution of gas across the catalyst bed. It was found that the nickel level of catalyst, having a maximum of 100 parts per million of nickel, could be reduced to 30 parts per million by adjusting the pressure of the air introduced into the vessel at 55 pounds p.s.i.g. This caused the abrasion of 560 pounds of dust per day from the catalyst. Since the total inventory of the catalyst in this TCC system was 308 tons, this amounted to a reduction of only .078% of the inventory, which on a percentage basis is an insignificant catalyst reduction. The diameter of the particles was substantially unchanged since only a minor amount of the surface film of the catalyst was removed by the abrader. By continuous operation of the abrader at 55 p.s.i.g., the nickel content of the catalyst can be maintained below 30 parts per million, since the build-up of nickel on the catalyst during operation takes place slowly and requires a substantial number of cycles of the catalyst through the reactor before any substantial increase in nickel content is observed.

Figure 7:
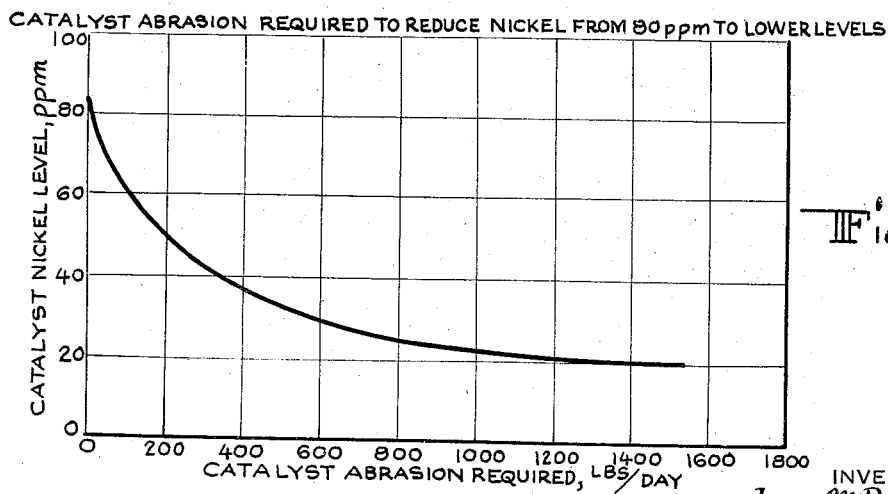
Figure 7 is a graph showing of the amount of catalyst abrasion required in a TCC system to bring the nickel content of the catalyst down from a known level to any desired level.

By operating the apparatus as illustrated above with respect to Example 1 over a wide range of pressures at or near the maximum gas discharge condition of the unit, data was accumulated from which Figures 5, 6 and 7 have been plotted. Figure 5 shows a graph of the relationship of dust produced in the abrading apparatus against the pressure in the nozzle of the apparatus. As the pressure in the system is increased, an increasing amount of dust (defined as particles smaller than 48 mesh) is produced as compared to broken beads. It is not desirable to remove catalyst in the abrader as broken beads, since this does not remove any substantial portion of the total nickel content on the catalyst. When bead breakage occurs the operation is not substantially better than removing used catalyst and replacing it with fresh catalyst and has all the disadvantages of such a system for raising catalytic activity. For practical limits of operation a pressure of at least 30 p.s.i.g. and preferably at least 40 p.s.i.g. should be maintained in the gas discharge manifold. It is seen by operating at such pressures that the quantity of dust produced relative to the quantity of broken beads is at its maximum or near maximum value.

Figure 6 is a graph showing the abrasion capacity of the abrading apparatus as a function of the inlet gas pressure. An increasing amount of abrasion of the catalyst is produced by increasing the pressure, but it is noted that above 1,200 pounds per day of abrasion production the additional nickel removal from the catalyst is practically nil. Hence, the unit would ordinarily be limited to the production of 1,200 pounds per day of abrasion product which is obtained at 165 p.s.i.g. However, the unit has been operated up to about 4,000 pounds per day of abrasion products. The maximum pressure to be used, however, will depend to some extent upon the particular design of the unit which is utilized and may be somewhat more or less than the 165 pounds found most effective for this particular design.

Figure 7 shows how much catalyst abrasion is required to bring the nickel content from a known level down to a desired level. Knowing how much catalyst abrasion is required, Figure 6 is then used to set the apparatus at the minimum pressure that will do this job.

Air, steam or other suitable gases can be used. The choice of the gas to be used will depend to some extent upon the type of gas available and the pressure of the gas available. While air or steam are satisfactory, other inert gases such as nitrogen or flue gas, inert to the catalyst, are equally acceptable. Knowing the operating conditions for air, the operating conditions when using any other gas can readily be calculated from known data and available tables. For instance, approximately 150 p.s.i.g. when using steam corresponds roughly to 30 p.s.i.g. when using air. Substantially higher pressures are therefore seen to be necessary when using steam in place of air because of the lower density of the steam.

The above indicated example and illustrations of the invention have been presented for a better understanding of the invention and are not intended to limit the scope of the invention. The only limitations intended are those found in the attached claims.

We claim:
1. In a moving bed hydrocarbon conversion system in which catalyst is gravitated in compact form through reaction and regeneration zones as part of an enclosed cyclic system, the attrition of the catalyst being minimized to require very little catalyst replacement and in which the nickel content of the catalyst is gradually built up to an intolerable level as a result of contact with nickel-containing hydrocarbons, the improved method of operation to maintain the catalyst active without requiring extensive catalyst replacement which comprises: gravitating from an elevated level in the system a side stream of the contact material, the flow rate of said side stream being a minor portion of the flow rate of the main stream of catalyst, passing said side stream downwardly through an abrading zone as a substantially compact gravitating column, introducing gas into the column of catalyst in said abrading zone at at least one location at a pressure greater than the critical pressure required to produce gas bubbles within the compact column capable of abrading material from the surface of the catalyst to a significant degree, whereby a surface film is removed from the catalyst in the formation of catalyst fines, separating the fines from the granular catalyst, returning the granular catalyst to the main catalyst stream, the gas pressure in the abrading zone being set at that pressure above the critical pressure required to maintain the nickel content on the catalyst in the main catalyst stream within tolerable limits without requiring extensive catalyst replacement.

2. Claim 1 further characterized in that the gas is introduced into the catalyst bed in the abrading zone from a plurality of points uniformly distributed across the catalyst bed, whereby at least substantially all the catalyst particles passed through the abrading zone are abraded.

3. Claim 1 further characterized in that the gas used for abrading purposes is air and said air is released into said abrading zone at a discharge pressure of about 40 to 165 p.s.i.g.

References Cited in the file of this patent

UNITED STATES PATENTS

| | | |
|---|---|---|
| 1,412,219 | Richardson | Apr. 11, 1922 |
| 1,936,154 | Carter | Nov. 21, 1933 |
| 2,452,172 | Willard | Oct. 26, 1948 |
| 2,598,309 | Say et al. | May 27, 1952 |
| 2,651,600 | Taff et al. | Sept. 8, 1953 |
| 2,729,330 | Newirth | Jan. 3, 1956 |
| 2,753,295 | Ramella | July 3, 1956 |

FOREIGN PATENTS

| | | |
|---|---|---|
| 538,097 | Italy | Jan. 16, 1956 |
| 539,905 | Canada | Apr. 23, 1957 |
| 775,824 | Great Britain | May 29, 1957 |